United States Patent [19]
Jiorle

[11] Patent Number: 5,121,555
[45] Date of Patent: Jun. 16, 1992

[54] PROXIMITY DIFFERENTIAL INDICATOR FOR ALIGNING MACHINE TOOLS

[76] Inventor: Michael A. Jiorle, 617 Warren St., Phillipsburg. N.J. 08865

[21] Appl. No.: 622,554

[22] Filed: Dec. 5, 1990

[51] Int. Cl.⁵ .................. G01B 3/22; B27G 23/00
[52] U.S. Cl. ............................ 33/642; 33/644; 33/645
[58] Field of Search ............ 33/644, 642, 632, 638, 33/641, 626, 645, 535, 533; 409/218; 408/116; 73/104, 105; 324/245, 251, 207.15, 207.2

[56] References Cited

U.S. PATENT DOCUMENTS

| | | |
|---|---|---|
| 2,716,285 | 8/1955 | Rudhart ............... 33/647 |
| 3,763,570 | 10/1973 | Anderson ............. 33/642 X |
| 4,328,621 | 5/1982 | Benjamin . |
| 4,338,723 | 7/1982 | Benjamin . |
| 4,375,129 | 3/1983 | Dunk . |
| 4,386,532 | 6/1983 | Benjamin . |
| 4,406,069 | 9/1983 | Clement . |
| 4,437,803 | 3/1984 | Volna . |
| 4,881,858 | 11/1989 | Volk et al. . |
| 4,890,421 | 1/1990 | Moore, Jr. et al. . |

*Primary Examiner*—Harry N. Haroian
*Attorney, Agent, or Firm*—Frank J. Benasutti

[57] ABSTRACT

A device and method for quickly aligning a machine tool spindle to the work surface of the machine tool. The device comprises a shank designed to be attached to the machine tool spindle, transducers used to sense the work surface, and indicators used by the operator to calibrate the position. The device can be used to determine and set the proper angle of the machine tool spindle in any two dimensions.

4 Claims, 2 Drawing Sheets

PROXIMITY DIFFERENTIAL INDICATOR FOR ALIGNING MACHINE TOOLS

BACKGROUND OF THE INVENTION

1. Field of the invention

The present invention relates generally to machine tools, and in particular to an apparatus and related method for establishing alignment between a machine tool's spindle and its work table.

2. Description of the Prior Art

During the operation of a machine tool such as a drill press, or milling device having a spindle depending vertically over a work surface or table, it is necessary to establish either perpendicularity or another known angular relationship between the spindle and table. A work piece situated on the work surface of the machine tool may have to have several machining operations performed on it as the work progresses. During each machining operation, the alignment between the machine tool spindle and the work surface of the machine is critical. The constant readjustment and realignment of the machine tool spindle relative to the machine tool work surface can be a time consuming task, with accuracy based on the manual skill of the machine operator.

The most primitive efforts to attain proper alignment have involved the use of levels placed upon the work surface of the machine tool, and then using the table adjustment to level the work surface. The disadvantage of these devices is that although the surface may be level, there are no assurances that the machine tool spindle is properly aligned with the surface. Many modern machine tools have spindle arms which are adjustable through large angles, as discussed in U.S. Pat. No. 4,437,803 to Volna.

Consequently, the industry has developed various "feeler gauge" type devices for squaring the spindle directly to the work surface. Such devices require direct physical contact of the feeler with the work surface to determine the proximity of the spindle to the work surface, and have indicator gauges to show the proximity as relative distance. By equalizing the proximity at various points to make the gauge or gauges read the same, as by adjusting either the spindle or the table, a direct orthogonal plane can be established with such devices. The "feeler" proximity indicators may be rollers such as described in the above referenced patent, or resiliently urged fingers such as disclosed in U.S. Pat. No. 4,406,069 to Clement.

However, such devices require time consuming calibration. For example, the 4,406,069 patent requires at least three spring-urged fingers, and is calibrated for each use by locating a gauge block on the work surface and rotating each finger over it, then adjusting both course and fine adjustment knobs to give each gauge a common "zero setting". The block is then removed and the table or spindle arm adjusted to make each gauge read the same.

Further, such devices are predicated upon a smooth work surface. Most machine tools are manufactured with T-slots or parallel grooves on the work surface to clamp a work piece to the work surface while it is being machined. Other holes or indents may eventually be caused on the work surface by general wear and tear and accidental machining operations. It is also common to have debris, left over from previous machining operations, deposited on top of the work surface. Since the devices in the prior art all rely on physical contact with the work surface, a marred or dirty work surface may produce an inaccurate alignment.

Finally, an inadvertently large adjustment or an adjustment in the wrong direction while the alignment device is in contact with the work surface may damage these devices.

SUMMARY OF THE INVENTION

The present invention comprises an alignment device which utilizes inductive proximity detectors which do not require contact with the machine tool work surface. Two inductive proximity detectors are mounted in an evenly spaced alignment in a housing block having a shaft adapted to be inserted in the chuck of the tool spindle. The housing also contains a differential electronic circuit and display indicator to display the relative difference in the proximity of each sensor to the work surface. The alignment of the spindle to the work surface can then be squared by rotating the housing and adjusting the spindle or table (or both) to center the indicator for zero difference along each axis.

A particular advantage of this alignment device is that it can be bench calibrated at manufacture and thereafter only checked periodically for accuracy. It does not require calibrating the indicator by a gauge block or other means at each usage. It is also lightweight and extremely portable.

Another advantage is that it has no movable parts in contact with the work surface, such as spring-urged fingers or rollers, that can wear out and cause inaccurate alignment information. Further, since the previous devices need to make physical contact with the work surface, time was wasted in positioning the device. When the spindle is lowered to bring the feeler probes in contact with the work surface, the operator must ensure that a probe does not rest in one of the T-Slots of the work surface or in a crevice or hole. This is unnecessary with the present device.

If a work piece requires several machining operations, it is possible in some instances that the alignment procedure can be performed off of the top of the work piece. That is, the work piece does not have to be removed from the work surface of the machine tool.

The invention also comprises the method of aligning a spindle and work surface using a device as described and claimed herein.

The present invention may also be used as a precision square for inspection purposes. A V-Block is situated on a granite surface plate. The shank of the device is secured horizontally to the V-Block with the device resting on its side. The work piece to be inspected is then brought within the optimum operating range of the device and the display indicates the squareness of the work piece.

Additional objects and advantages will be apparent from the following description and drawings.

DETAILED DESCRIPTION OF THE INVENTION

Figure 1:
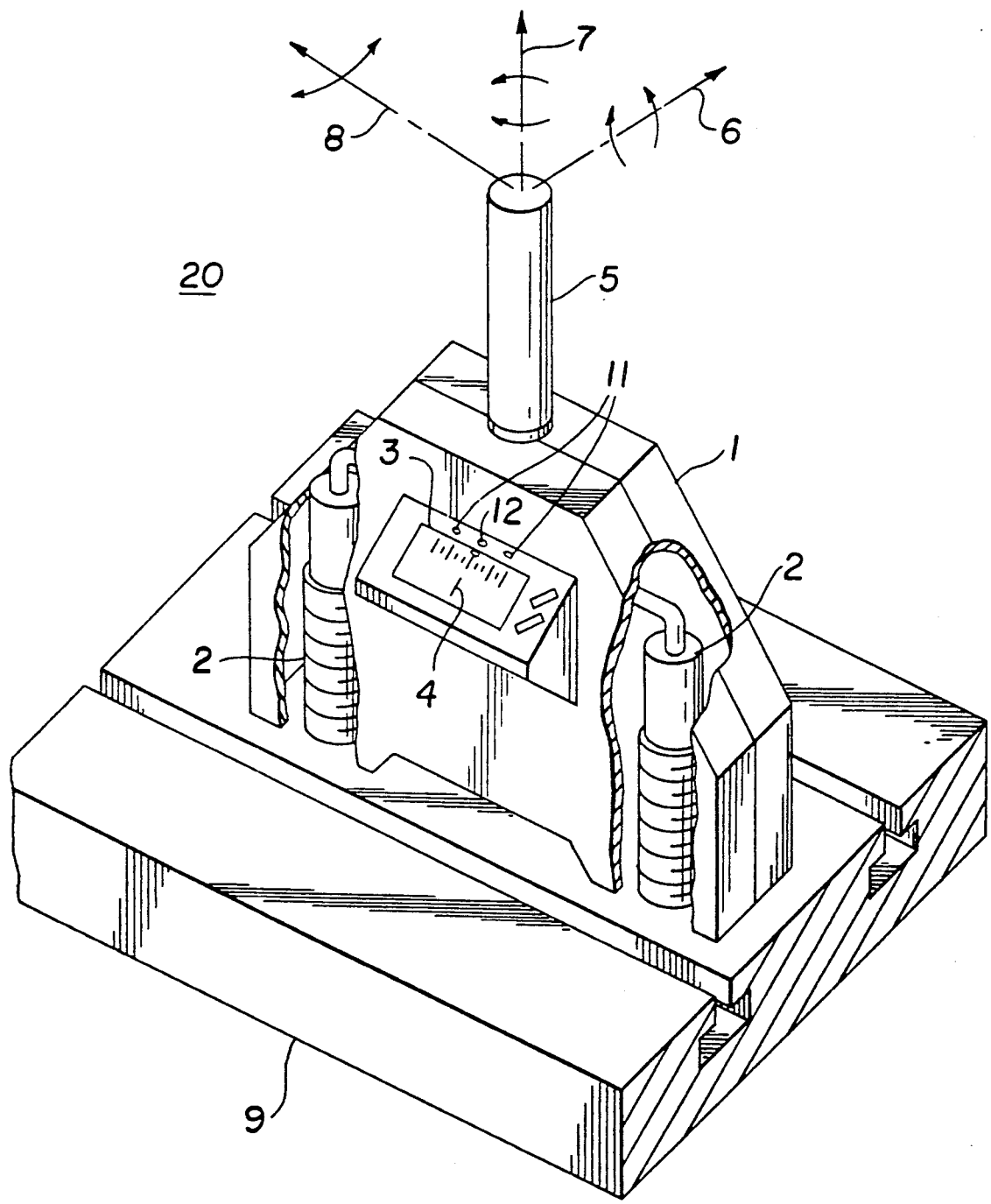
FIG. 1. is an isometric view, with partial cut-outs, of an instrument for establishing the alignment between the spindle of a machine tools and the work surface of a machine tool, in accordance with the invention.

In FIG. 1 is shown a differential indicator instrument, generally designated 20. To align a machine tool's spindle relative to its work surface, the device 20 is attached to the spindle by placing the shank 5 into the chuck of the spindle. The shank 5 is attached to a housing 1 which houses the remaining components of the instrument.

Two inductive proximity sensors 2 are mounted in the housing 1 in a spaced alignment equidistant from the axis of shaft 5. In the presently preferred embodiment, the inductive proximity sensors 2 are of the type manufactured by BALLUFF as model BAW 018-PB-1-K. The housing 1 has threaded pockets to hold the inductive sensors 2. During the manufacture of the instrument, initial adjustment is made by threading each sensor to a depth which produces equal proximity signals over a known calibration surface. Once all calibrations are complete, the inductive sensors are locked into place and never have to be adjusted again.

In operation, the spindle is lowered until two red LED's 11 extinguish and a green LED 12 activates. This notifies the operator that the inductive proximity sensors 2 are within their optimum range for detecting the proximity of the machine tool's work surface 9. An analog meter 3 then indicates the angularity of the spindle to the table. The deflection of the meter needle 4 is directly proportional to the angle of the machine spindle relative to the work surface, and the direction of deflection indicates the higher and lower sides. A negative number will be displayed if the left sensor is higher than the right sensor, and a positive number if the left sensor is lower than the right sensor.

Although the preferred embodiment calls for an analog meter 3, any display which can indicate the alignment of the machine spindle will be suitable. For example, a liquid crystal display, a row of LED's or the like can be utilized. If a LCD is substituted for the analog meter, a bar graph and a numerical display would be provided.

The circuit design and the size of the inductive proximity sensors 2 determine the distance above the work surface which is within the optimum operating range. The inductive sensors 2 detect the metal work surface, and a current is generated corresponding to the individual sensor's height above the work surface. The closer a sensor is to the work surface, the lower the current that is generated.

Figure 2:
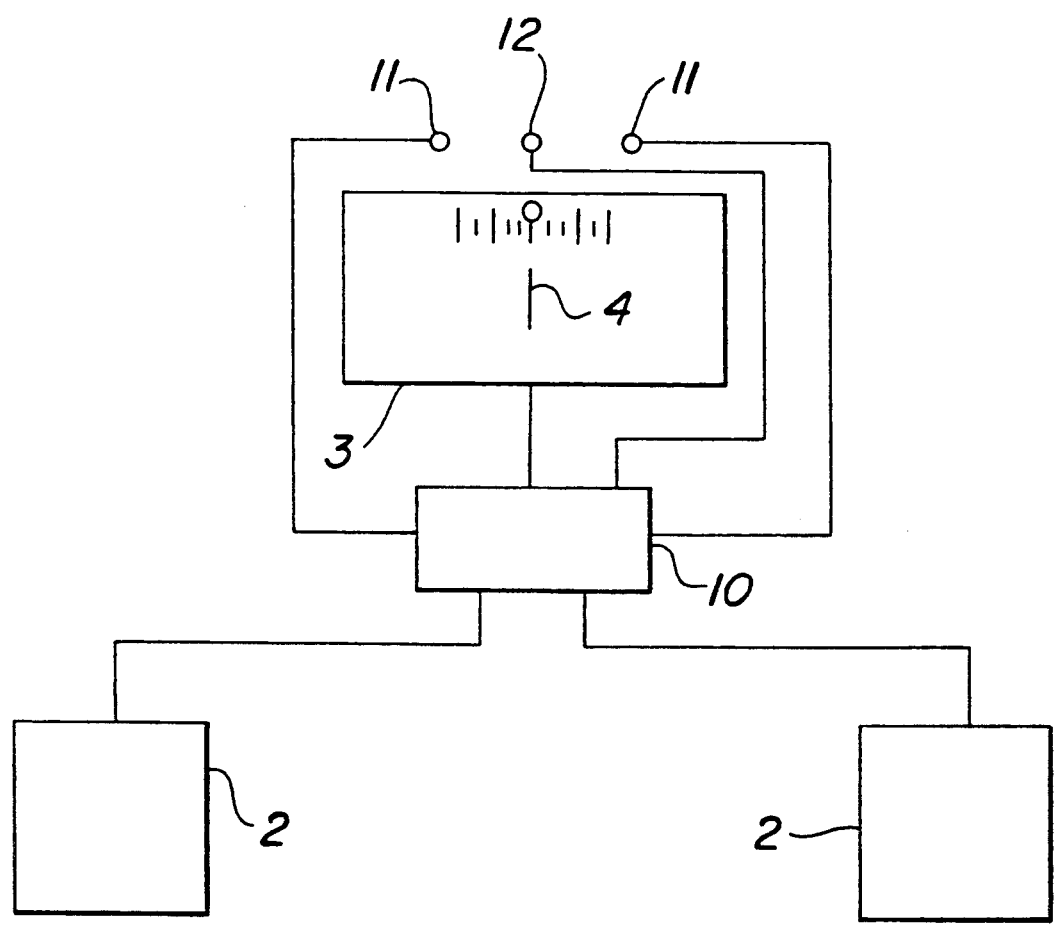
FIG. 2 is a schematic drawing of the electronic circuitry.

A differential circuit 10, as shown schematically in FIG. 2, determines the difference between the currents of the two sensors and generates a proportional output which is displayed in the meter 3. Such differential circuits are known to those of ordinary skill and require no further description. Thus, if the machine head is not perpendicular in one orthogonal plane, a greater current is generated by one of the sensors, moving the meter needle 4 off center or off of zero. The machine head is then adjusted to zero the meter 3. When the meter is zeroed, the machine head is perpendicular to the table in one orthogonal plane.

To align the spindle perpendicular to the work surface 9, the meter 3 must be zeroed, i.e. the meter needle 4 is exactly in the center. A deviation of the meter needle 4 either left or right indicates which sensor is higher. To zero the meter, the spindle or table must be adjusted accordingly. In FIG. 1, the machine spindle may be rotated about the side-to-side horizontal axis 6 to zero the meter. The instrument 20 is then rotated 90° around vertical axis 7, and the meter 3 is zeroed again by rotating the machine spindle around the front-to-back horizontal axis 8. After the meter is zeroed for the second time, the spindle is exactly perpendicular to the work surface. Similar adjustment could be made using the adjustments on the table.

A twelve volt AC adaptor supplies the requisite power to operate the present invention. It is a simple matter to replace the transformer with a battery inside the housing 1 to increase the invention's portability.

This instrument may also be used to fix the spindle at a desired angle. A properly angled sine plate is set onto the work surface 9, and the meter needle 4 is zeroed over the sine plate rather than the work surface, as was done previously.

Once perpendicularity or a desired angle has been achieved, the differential indicator 20 is removed from the chuck and replaced by the appropriate tool.

Various modifications are apparent from on the above description. For example, three or more inductive proximity sensors could be utilized to eliminate the need to rotate the differential indicator 90°.

I claim:

1. A device for squaring the alignment between the spindle of a machine tool to be perpendicular to the work surface of the machine tool, comprising:
    a shaft adapted for mounting the device to the spindle;
    a housing secured to the shaft;
    a plurality of inductive proximity sensors mounted on the housing in a spaced relation about the shaft;
    means associated with the inductive sensors for indicating the relative position of the sensors with respect to the work surface.

2. The device of claim 1 wherein said means comprises a differential circuit outputting a signal proportioned to the relative position of the sensors to an indicator.

3. The device of claim 2 wherein the indicator comprises a liquid crystal display.

4. A process for squaring the alignment between the spindle of a machine tool to be perpendicular to the work surface of the machine tool without physically contacting the work surface, comprising the steps of:
    (a) connecting a plurality of inductive proximity sensors in a spaced arrangement to the spindle;
    (b) bringing the sensors into proximity, without contact, to the work surface;
    (c) comparing the proximity signals from the sensors to each other and determining the difference; and,
    (d) adjusting said difference to zero by moving either the spindle or work surface.

* * * * *